Patented Nov. 15, 1949

2,488,501

UNITED STATES PATENT OFFICE 2,488,501

1,4-DI(ALKENYLPHENOXY)-2-BUTENES

Clarence L. Moyle, Clare, Mich., assignor to The Dow Chemical Company, Midland, Mich., a corporation of Delaware No Drawing. Application September 13, 1948, Serial No. 49,135

4 Claims. (Cl. 260—613)

This invention is directed to 1,4-di(alkenylphenoxy)-2-butenes having the formula

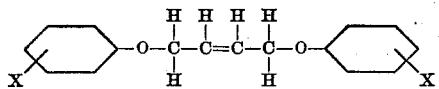

wherein X is an alkenyl radical.

These new compounds may be prepared by reacting an alkali metal alkenylphenolate with 1,4-dibromo-2-butene having the formula

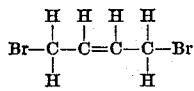

The reaction may be carried out in an inert organic solvent and in the presence of a small amount of water, if desired. Good yields are obtained in preparations employing two molecular proportions of the alkenylphenolate and one molecular proportion of 1,4-dibromo-2-butene. The reaction has been found to take place at a temperature of from 30° to 100° C. Following the reaction, the separation is accomplished by conventional means.

In a representative preparation, 2 mols of sodium hydroxide is dissolved in methyl alcohol containing a small amount of water. 2 mols of an alkenylphenol is added to the alcoholic sodium hydroxide solution to form the sodium salt of the phenol. 1 mol of 1,4-dibromo-2-butene is then added portionwise to this phenolate solution and the resulting mixture warmed for a short time at a temperature of from 40° to 80° C. to complete the reaction. The crude reaction product is dispersed in a non-reactive water-immiscible organic solvent such as methylene dichloride or benzene, and the resultant mixture successively washed with dilute aqueous ammonium or sodium hydroxide and water, and dried over silica gel. The solvent is then removed by evaporation to obtain the 1,4-di(alkenylphenoxy)-2-butene.

The 1,4-dibromo-2-butene employed as a starting material is readily prepared by dissolving 1,3-butadiene in ethylene dichloride and reacting this solution with bromine at low temperatures. The desired product of reaction is obtained from the crude reaction mixture by conventional methods of purification, such as fractional distillation and fractional crystallization, and has a melting point of 53° C.

The following examples illustrate the invention and are not to be construed as limiting.

Example 1.—1,4-di(2-allylphenoxy)-2-butene

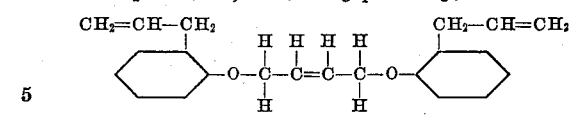

14.8 grams (0.37 mol) of sodium hydroxide was reacted with 50 grams (0.37 mol) of 2-allylphenol in 93 grams of ethyl alcohol and 14 grams of water to form an alcoholic solution of the phenolate. 38.5 grams (0.18 mol) of 1,4-dibromo-2-butene was added portionwise to this solution and the resulting mixture warmed for ½ hour at 50° to 60° C. to complete the reaction. The crude reaction product was then washed with dilute aqueous sodium hydroxide, the organic products of reaction extracted with methylene dichloride and the solvent extract washed with water, and dried over silica gel. The solvent was then removed by evaporation to obtain 1,4-di(2-allylphenoxy)-2-butene as an orange oil having a density of 1.05 at 30° C. and a refractive index $n/D$ of 1.5609 at 35° C.

Example 2.—1,4-di[2-(2-methylallyl)phenoxy]-2-butene

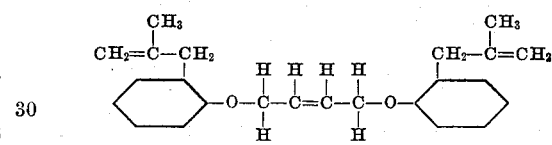

12.0 grams (0.3 mol) of sodium hydroxide and 44.4 grams (0.3 mol) of 2-(2-methylallyl)phenol were reacted in 60 grams of methyl alcohol and 8 grams of water. 32.2 grams (0.15 mol) of 1,4-dibromo-2-butene was added portionwise to the above solution and the resulting mixture warmed for 30 minutes at 50° to 60° C. to complete the reaction. The crude product was dispersed in benzene. This solvent mixture was successively washed with dilute aqueous sodium hydroxide and a saturated aqueous solution of sodium chloride, dried over silica gel and filtered. The solvent was then removed from the filtrate by evaporation to obtain 1,4-di[2-(2-methylallyl)-phenoxy]-2-butene as a residue. The latter was a yellow oil having a density of 1.17 at 25° C.

Example 3

In a similar manner, 8.0 grams (0.2 mol) of sodium hydroxide, 29.6 grams (0.2 mol) of 4-(2-methylallyl)phenol, and 21.4 grams (0.1 mol) of 1,4-dibromo-2-butene were reacted in 28 grams of methyl alcohol and 6 grams of water. The crude reaction product was dispersed in methylene dichloride and this solvent mixture successively washed with dilute aqueous sodium hydroxide and water, and dried. The solvent was then removed by evaporation to obtain 1,4-di[4-(2-methylallyl)phenoxy]-2-butene as an orange oil having a density of 1.04 at 25° C.

*Example 4*

10.0 grams (0.25 mol) of sodium hydroxide and 33.5 grams (0.25 mol) of 2-propenylphenol were mixed together in 53 grams of 95 per cent ethyl alcohol. 26.8 grams (0.125 mol) of 1,4-dibromo-2-butene was added portionwise to this alcoholic phenolate solution and the resulting mixture warmed for 15 minutes at 50° to 60° C. to complete the reaction. The crude product was then dispersed in benzene. This solvent mixture was successively washed with dilute aqueous sodium hydroxide and water, dried with anhydrous sodium sulphate and filtered. The solvent was then removed from the filtrate by evaporation to obtain 1,4-di(2-propenylphenoxy)-2-butene as a crystalline solid. The latter was further purified by successive recrystallization from methyl alcohol and isopropyl alcohol and found to have a melting point of 95° C.

In a similar manner other 1,4-di(alkenylphenoxy)-2-butenes may be prepared, of which the following are representative:

1,4-di(4-allylphenoxy)-2-butene by reacting sodium 4-allylphenolate with 1,4-dibromo-2-butene.

1,4-di[2-(2-methylpropenyl)phenoxy]-2-butene by reacting 4-(2-methylpropenyl)phenolate with 1,4-dibromo-2-butene.

1,4-di(4-propenylphenoxy)-2-butene by reacting sodium 4-propenylphenolate with 1,4-dibromo-2-butene.

The new 1,4-di(alkenylphenoxy)-2-butenes are valuable as constituents of insecticide compositions and as modifiers in plastic compositions. They are oils or crystalline solids, somewhat soluble in many organic solvents, substantially insoluble in water, not appreciably affected by carbon dioxide and non-corrosive to the skin of man and higher animals.

The new compounds have been found effective as insecticides and are adapted to be employed as constituents of compositions for the control of agricultural and household pests. In such use, they may be compounded in finely-divided inert solids to form agricultural dusts. Such mixtures may be dispersed in water with the aid of a wetting agent, and the resulting aqueous suspensions employed as sprays. In other procedures, the new compounds may be employed as constituents of oil in water emulsions or in water dispersions with or without the aid of wetting, dispersing or emulsifying agents.

In an illustrative operation, concentrates were prepared by mixing and dispersing together 80 parts by weight of toxicant, 10 parts of the dioctyl ester of sodium sulfosuccinic acid (Aerosol Ot) and 10 parts of refined kerosene. The concentrates were then dispersed in water to form spray compositions containing various amounts of toxicants per 100 gallons. Results obtained with these compositions are recorded in the following table:

| Toxicant | Organism | Pounds of Toxicant Per 100 Gallons | Percentage Control |
|---|---|---|---|
| 1,4-di (2-allylphenoxy)-2-butene | Two-spotted spider mite | 2.00 | 100 |
|  | Mexican bean beetle | 0.125 | 100 |
| 1,4-di [2-(2-methylallyl) phenoxy]-2-butene | Two-spotted spider mite | 1.00 | 88 |
|  | Bean aphid | 1.00 | 100 |

In a similar manner, aqueous sprays were prepared from a concentrate consisting of 50 parts by weight of 1,4-di(2-allylphenoxy)-2-butene, 10 parts of the dioctyl ester of sodium sulfosuccinic acid, 15 parts of pine oil and 25 parts of refined kerosene. When these sprays were employed against bean aphid, a 100 per cent control of the organisms was obtained at a toxicant concentration of 0.50 pound per 100 gallons.

I claim:

1. A 1,4-di(alkenylphenoxy)-2-butene having the formula

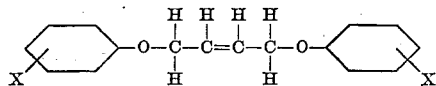

wherein X is an alkenyl radical.

2. 1,4-di(2-allylphenoxy)-2-butene.

3. 1,4-di[2-(2-methylallyl)phenoxy]-2-butene.

4. 1,4-di[4-(2-methylallyl)phenoxy]-2-butene.

CLARENCE L. MOYLE.

No references cited.